Z. FROST.
MOWER AND REAPER KNIFE-SHARPENER.
No. 192,427. Patented June 26, 1877.
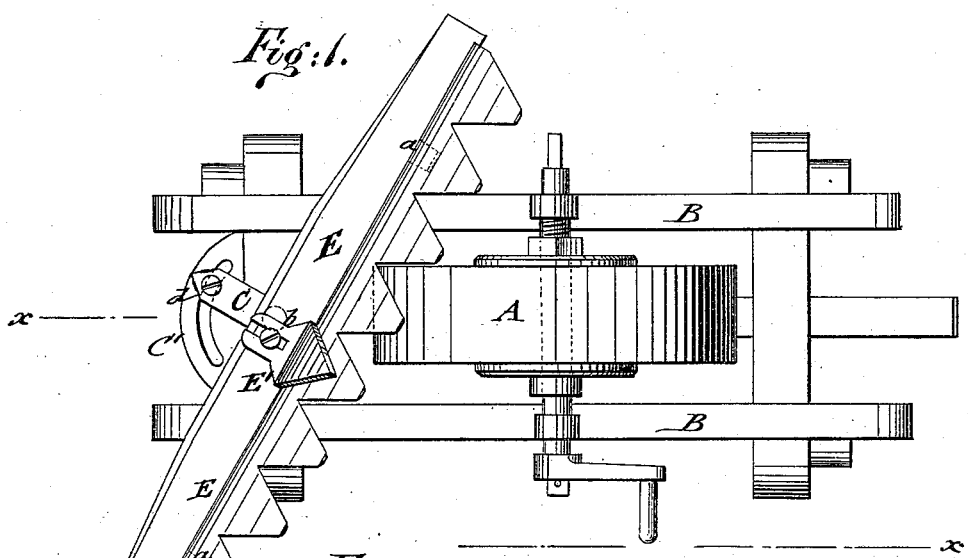
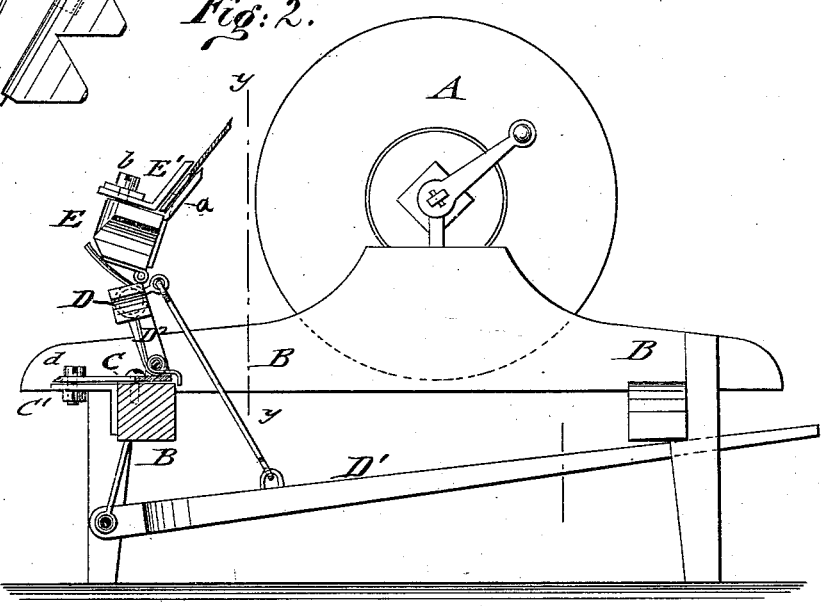
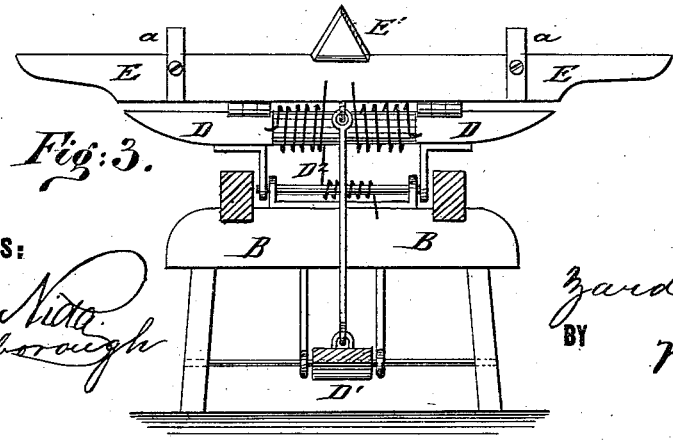

UNITED STATES PATENT OFFICE.

ZARDA FROST, OF KINMUNDY, ILLINOIS, ASSIGNOR TO HIMSELF AND WILLIAM H. WHITE, OF SAME PLACE.

IMPROVEMENT IN MOWER AND REAPER KNIFE SHARPENERS.

Specification forming part of Letters Patent No. 192,427, dated June 26, 1877; application filed March 24, 1877.

*To all whom it may concern:*

Be it known that I, ZARDA FROST, of Kinmundy, in the county of Marion and State of Illinois, have invented a new and Improved Attachment to Grindstones for Sharpening Knives of Mowing and Reaping Machines, of which the following is a specification:

This invention relates to an improved attachment to grindstones by which the cutters or knives of mowing and reaping machines can be ground by one person at the same bevel throughout without removing the sections from their bar, the sharpening being accomplished in half the time as at present, and in a more uniform and more perfect manner, so that a better cut of the knives is obtained.

The invention consists in the combination, in a grinding apparatus for mowing and reaper knives, of a centrally-pivoted base-plate, a swinging spring and treadle acted frame, and a hinged vibrating and spring-cushioned supporting-bar, as will be hereinafter more fully described, and then pointed out in the claim.

In the accompanying drawing, Figure 1 represents a top view, Fig. 2 a side view, partly in section on line $x\ x$, Fig. 1, and Fig. 3 a vertical transverse section on line $y\ y$, Fig. 2, of a grindstone with my improved attachment for grinding the knives of mowing and reaping machines.

Similar letters of reference indicate corresponding parts.

In the drawing, A represents a grindstone of the usual size employed for grinding the knives of mowing and reaping machines, and B the supporting-frame of the same. To a centrally-pivoted base-plate, C, at one end of frame B is applied the vibrating frame D, which is carried toward the stone A by link-connection with a treadle, $D^1$, and back clear of the stone by a suitable spring, $D^2$, attached to the pivot-rod of frame D. To the top piece of frame D is hinged a spring-acted bar, E, on which the cutting-knives of the mower or reaper are placed, and retained by lugs $a$ and a sliding clamp, $E'$, at the center of the bar, the clamp being adjustable for different thicknesses of knives by the slotted rear part and clamping-screw $b$.

The base-plate C swings on its center-pivot, and admits the lateral adjustment of frame D and bar E into any angle toward the stone, according to the bevel of the cutting-knives. The base is adjusted along a slotted guide-plate, $C'$, and firmly secured in the required position by a clamp-screw, $d$.

When the supporting-frame has been set to the required bevel of the knives, and the knife-section firmly secured by the sliding clamp $E'$, the treadle is depressed, and thereby the knife brought into contact with the stone, and ground by turning the same. The frame is then adjusted to the bevel of the other side of the knife, and this side then sharpened in the same manner.

One-half of the knife is ground on each side of the stone, which keeps the stone true on the face, the crank of the stone being reversed from one end of the shaft to the other when the opposite side of the knife is ground, to admit the more convenient turning of the stone in the alternating position of the knife-holding frame.

Having thus described my invention, I claim as new and desire to secure by Letters Patent—

The combination of a centrally-pivoted base-plate, C, a swinging spring and treadle acted frame, D, and a hinged vibrating and spring-cushioned supporting-bar, E, substantially as specified.

ZARDA FROST.

Witnesses:
J. M. ROTAN,
SILMAN RASER.